H. C. ENGLAND.
SHOCK BINDER.
APPLICATION FILED SEPT. 10, 1915.
1,222,856.
Patented Apr. 17, 1917.
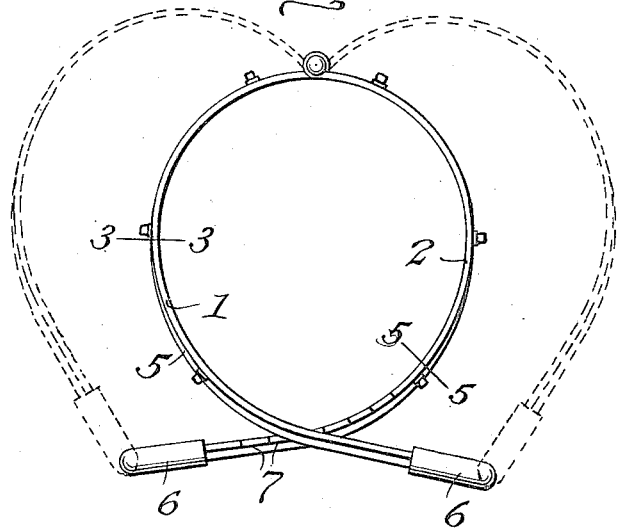
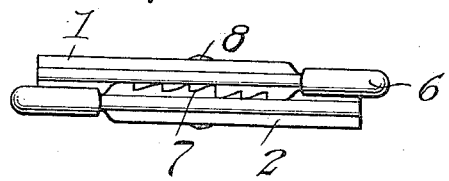
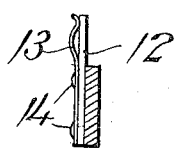
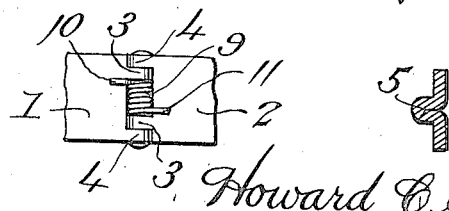
WITNESSES
Carroll Bailey
Benj. R. Newcomb
INVENTOR
Howard C. England
BY Richard B. Owen.
ATTORNEY

UNITED STATES PATENT OFFICE.

HOWARD C. ENGLAND, OF LISBON, MARYLAND.

SHOCK-BINDER.

1,222,856. Specification of Letters Patent. Patented Apr. 17, 1917.

Application filed September 10, 1915. Serial No. 50.049.

*To all whom it may concern:*

Be it known that I, HOWARD C. ENGLAND, a citizen of the United States, residing at Lisbon, in the county of Howard and State of Maryland, have invented certain new and useful Improvements in Shock-Binders, of which the following is a specification.

My invention relates to a novel and improved shock binder of that type which is used for temporarily compressing and binding the shock prior to permanently tying the same with a cord.

It is one object of my invention to provide a shock binder of the above-mentioned description, which comprises two segmental members hinged together and adapted to encircle the shock, said members then having the free ends drawn around the shock in overlapping relation and locked until the shock can be tied with a cord in the usual manner.

Another object resides in providing novel means for fastening the free ends of the segmental members together.

A further object is to provide means on the shock binder for supporting a cord in tying relation relative to the shock.

And yet a further object resides in forming each segmental member identical, so that, as a new article of manufacture, the shock binder will be novel in that only one die is required to form the complete article.

In the drawings annexed hereto and forming a part of the specification, and in which I have illustrated a preferred embodiment of the invention:

Figure 1 is a top plan view of the shock binder in a locked position.

Fig. 2 is a front elevation of the same.

Fig. 3 is a sectional view on the line 3—3 of Fig. 1.

Fig. 4 is a detail front elevation of the hinged pin, and

Fig. 5 is a sectional view on the line 5—5 of Fig. 1.

In detail:

The shock binder, as herein illustrated, comprises two segmental members 1 and 2, both of which are identical in construction and therefore may be formed from the same die.

Each of the segmental members 1 and 2 is provided at one end with the hinge straps 3 and 4, while from about the center of the free end, there extends an exterior rib 5, best shown in Fig. 5, and which reinforces the said members at that portion provided with the rib so as to make the same substantially rigid. At the free end of each member 1 and 2 is a handle 6 and adjacent which are formed ratchet teeth 7 for purposes to be hereinafter set forth. Said members 1 and 2 are hinged together by means of the pivot pin 8, which also carries the coil spring 9 positioned so that one end 10 rests against the member 1 and the other end 11 rests against member 2 on the inside, thus the expanding tension of this spring is utilized in normally maintaining the members 1 and 2 in the position indicated in dotted lines in Fig. 1.

Adjacent the upper edge of each of the members 1 and 2 are provided the uprights 12 carrying leaf springs 13, as shown in Fig. 3, which are secured in place by means of rivets 14. A plurality of these are arranged on each segmental member and are adapted to support a cord in tying relation to the shock, so that the cord may be tied around the shock prior to releasing the shock binder and thus when the latter is finally released the shock will be tied in the compressed condition.

In order to tie a shock the segmental members are placed around the shock and drawn past each other in overlapping relation, much in the same manner that one would tie a loop knot around a shock. In drawing the said free ends and handles 6 past each other, the ratchet teeth 7 of these members override and finally lock so as to retain a shock in the compressed condition. A cord is passed under the springs 13 and tied around the shock, then the handles 6 are sprung vertically away from each other and this releases the ratchet teeth thereby freeing the said segmental members which open out and release the cord, but leaving the shock tied into a compressed condition.

While, in the foregoing, I have described a specific embodiment of the invention it is to be understood that various modifications in the form and arrangement of the various parts may be resorted to without departing from the spirit and scope of the invention as defined in the appended claims. For instance, it may be found preferable to form that portion of each segmental member which is not reinforced by the rib 5 of resilient construction, which would make the entire device more flexible.

I claim:—

1. A shock binder including two segmental members hinged together and adapted to encircle a shock, and ratchet teeth formed adjacent the free end of each member, said free ends being arranged to be drawn past each other to compress the shock and positively lock said ratchets to hold the shock in the compressed condition, substantially as described.

2. A shock binder including two segmental members hinged together and adapted to encircle a shock, ratchet teeth formed adjacent the free end of each member, said free ends being arranged to be drawn past each other to compress the shock and positively lock said ratchets to hold the shock in the compressed condition, and spring clips carried by said members to support a cord in tying relation to the shock, substantially as described.

3. A shock binder including two segmental members hinged together and adapted to encircle a shock, means normally springing said members to an open position, and ratchet teeth carried by the free end of each member, said free ends being arranged to be drawn past each other to compress the shock and lock said ratchets to hold the shock in a compressed condition, substantially as described.

4. A shock binder including two segmental members hinged together and each having a resilient portion adjacent the hinge, said members being adapted to encircle a shock, and ratchet teeth carried by the free end of each member, said free ends being arranged to be drawn past each other to compress the shock and lock said ratchets to hold the shock in the compressed condition, substantially as described.

5. A shock binder including two segmental members hinged together and each having a resilient portion adjacent the hinge and a reinforced rigid portion forming the free end, and ratchet teeth carried by the free end of each member, said free ends being arranged to be drawn past each other to compress the shock and lock said ratchets to hold the shock in the compressed condition, substantially as described.

6. As an article of manufacture, a shock binder, comprising two similarly formed segmental members each provided with a half hinge portion at one end and having ratchet teeth formed at the other end, the ratchet teeth of one member co-acting with those of the other member to form a positive lock, and means pivoting said hinge members together, substantially as described.

7. As an article of manufacture, a shock binder, comprising two segmental members each provided with a rigid length running into a resilient portion terminating in a half hinge member, means pivoting said half hinge members together, and means for locking the free ends of said members in overlapping relation to compress and bind the shock, substantially as described.

In testimony whereof I affix my signature in presence of two witnesses.

HOWARD C. ENGLAND.

Witnesses:
FRANK M. LEWIS,
A. R. MOLESWORTH.

Copies of this patent may be obtained for five cents each, by addressing the "Commissioner of Patents, Washington, D. C."